(12) United States Patent
Orita et al.

(10) Patent No.: US 6,284,046 B1
(45) Date of Patent: Sep. 4, 2001

(54) OPTICAL FIBER RESIN COATING APPARATUS

(75) Inventors: Nobuaki Orita; Hisashi Koaizawa, both of Chiba (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/245,341

(22) Filed: Feb. 5, 1999

(51) Int. Cl.$^7$ .................................................. B05C 3/172
(52) U.S. Cl. .......................... 118/405; 118/420; 118/429; 118/DIG. 18
(58) Field of Search .................................. 118/400, 404, 118/405, 420, 429, DIG. 18; 425/97

(56) References Cited

U.S. PATENT DOCUMENTS 5,449,408 * 9/1995 Koaizawa et al. ................... 118/405
5,976,611 * 11/1999 Okuno et al. ..................... 118/420 X
6,030,658 * 2/2000 Tsuchiya et al. ................. 427/163.2

FOREIGN PATENT DOCUMENTS 4-124048   4/1992 (JP).
6-279047  10/1994 (JP).

* cited by examiner

Primary Examiner—Mark A. Osele
(74) Attorney, Agent, or Firm—Arent Fox Kintner Plotkin & Kahn

(57) ABSTRACT

An optical fiber resin coating apparatus including: a nipple including a nipple hole, and a resin reserving chamber for reserving resin, a meniscus-shaped portion being positioned at an end of the nipple hole; a resin coating die including a tapered-hole and a land portion continued to the tapered-hole and defining a hole of a diameter which defines a diameter of a resin coated optical fiber; and an intermediate die provided between the nipple and the resin coating die, including a hole communicating the meniscus-shaped portion and the second tapered-hole, a hole communicating to the resin reserving chamber. A first resin flow path is defined at a boundary portion of the nipple and the intermediate die. A second resin flow path is defined at a boundary portion of the intermediate die and the resin coating die.

7 Claims, 6 Drawing Sheets

OPTICAL FIBER RESIN COATING APPARATUS

BACKGROUND OF THE INVENTION

1. Field of the Invention

The present invention relates to an optical fiber resin coating apparatus, more particularly, an optical fiber resin coating apparatus for uniformly coating a resin on an optical fiber at a high speed.

2. Description of the Related Art

An optical fiber consisting of a core and a cladding provided at an outer circumferential of the core is produced by heating a preform of the optical fiber at a furnace and drawing it out from the furnace. Thereafter, the optical fiber is coated by a resin to produce a resin coated optical fiber.

Japanese Unexamined Patent Publication (Kokai) 6-279047 discloses a technology for coating a resin on an optical fiber. FIG. 1 is a sectional view of an optical fiber resin coating apparatus of Japanese Unexamined Patent Publication (Kokai) 6-279047.

For coating resin on an optical fiber, in addition to the optical fiber resin coating apparatus shown in FIG. 1, as disclosed in Japanese Unexamined Patent Publication (Kokai) 6-279047, it is necessary to provide a resin supply means for supplying a resin to the optical fiber resin coating apparatus, a moving means for introducing an optical fiber into the optical fiber resin coating apparatus and drawing out a resin coated optical fiber from the optical fiber resin coating apparatus, a cooling means for cooling the drew out hot resin coated optical fiber, an outer diameter measurement means for measuring an outer diameter of the resin coated optical fiber, a control means for reading the measured outer diameter and controlling a drawing-out speed of the moving means, and resin supply parameters at the resin supply means, and a winding means for winding the cooled resin coated optical fiber. Below, the optical fiber resin coating apparatus in FIG. 1 will be described in detail.

The optical fiber resin coating apparatus is formed as an assembly 3 of a combination of a nipple 1 and a resin coating die 2.

A resin flow path 4 is defined at the gap (a boundary portion or an interface) of the nipple 1 and the resin coating die 2. A nipple hole 5 of the nipple 1 and a die hole 6 of the resin coating die 2 are aligned in the assembly 3 at a same center line. The nipple hole 5 is constituted by a tapered-hole portion 5a and a land portion 5b. A resin supply chamber 7 is provided in the coating die 2 in a concentricity with the die hole 6. A resin supply inlet 8 is also provided in the coating die 2 to supply a resin 9 to the resin supply chamber 7. An optical fiber 10 is introduced into the nipple hole 5 and the die hole 6 to be coated with the resin 9. The resin 9 is supplied to the die hole 6 at a predetermined pressure from the resin supply chamber 7 through the resin flow path 5, to produce a resultant resin coated optical fiber 11.

A meniscus-shaped portion 12, which is a boundary plane of the resin 9 and the optical fiber 10, is formed at an outlet portion of the nipple hole 5, and a circular flow 13 of the resin 9 is caused in a cavity formed inside of tapered-hole portion 6a of the die hole 6 in the resin coating die 2.

The optical fiber resin coating apparatus disclosed in Japanese Unexamined Patent Publication (Kokai) 6-279047 suffers from the disadvantages of a partial lack (partial failure) of the coating of the resin on the optical fiber 10 in certain portions and/or unevenness of the diameter of the resin coated optical fiber 11 when the resin coated optical fiber 11 is drawn out from the optical fiber resin coating apparatus a high speed. Accordingly, the optical fiber resin coating apparatus of Japanese Unexamined Patent Publication (Kokai) 6-279047 suffers from the disadvantage of a limitation of the speed up of the drawing-out speed. Consequently, the optical fiber resin coating apparatus of Japanese Unexamined Patent Publication (Kokai) 6-279047 can not achieve a high productivity of the resin coating.

Japanese Examined Patent Publication (Kokoku) 7-91092 discloses a technology for preventing the partial lack (failure) of the coating and/or unevenness of the diameter of the resin coated optical fiber by suitably defining (designing) the size of the resin flow path 4 and the angle of the tapered-hole portion 6a in the resin coating die 2.

The technology of Japanese Examined Patent Publication (Kokoku) 7-91092 can provide a good result below the drawing speed of the resin coated optical fiber is 1000 m/min, but still suffers from the disadvantages of the partial lack (failure) of the coating and/or unevenness of the diameter of the resin coated optical fiber at higher speed drawing.

According to an analysis of such disadvantages by inventors of the present invention, it was found that the reasons of the partial lack of the resin coating and/or the unevenness of the diameter of the resin coated optical fiber during high speed drawing had probably been due to disruptions in the circular flow 13 in the cavity of the tapered-hole portion 6a of the resin coating die 2 during high speed drawing. Namely, the high speed drawing of the resin coated optical fiber 11 disrupted the smooth circular flow in the cavity of tapered-hole portion 6a and caused vibration of the moving optical fiber 10 and destabilized the meniscus-shaped portion 12 formed at the outlet portion of the nipple hole 5.

The countermeasures of the technology disclosed in Japanese Examined Patent Publication (Kokoku) 7-91092 run up against the disadvantages of the limit on speed of Japanese Unexamined Patent Publication (Kokai) 6-279047.

SUMMARY OF INVENTION

An object of the present invention is to provide an optical fiber resin coating apparatus enabling a uniform coating on an optical fiber during high speed drawing.

According to the present invention, there is provided an optical fiber resin coating apparatus comprising: a nipple including a nipple hole, a resin reserving chamber for reserving resin, and a resin supply inlet, said nipple hole having a first tapered-hole portion introducing an optical fiber therethrough and a first land portion continuing from the first tapered-hole portion and defining a first hole of a first diameter, a meniscus-shaped portion being positioned at an end of the first land portion; a resin coating die, and including a second tapered-hole and a second land portion continued to the second tapered-hole and defining a second hole of a second diameter which is defined a diameter of a resin coated optical fiber; and an intermediate die provided between the nipple and the resin coating die, including a third hole which communicates an end of the nipple hole and the second tapered-hole and has a third diameter, a fourth hole which communicates to the resin reserving chamber, a center axis of the nipple hole in the nipple, a center axis of the second hole of the resin coating die and a center axis of the third hole of the intermediate die being matched, a first resin flow path being defined at a boundary position of the nipple and the intermediate die, said first resin flow path communicating the resin reserving chamber, the end of the nipple hole and the third hole in the intermediate die, and a second resin flow path being defined at a boundary position of the intermediate die and the resin coating die, said second resin flow path communicating the third hole in the intermediate die, the second tapered-hole in the resin coating die and the fourth hole of the intermediate die.

Preferably, said first hole of the first diameter, said third hole of the third diameter, said second hole of the second diameter, said second tapered-hole, said first and second resin flow paths are defined, so that a first circular resin flow path, including said resin reserving chamber, said first resin flow path, said third hole, a cavity defined in said second tapered-hole, said second resin flow path, said fourth hole and said resin reserving chamber, in formed, and a second circular resin flow is formed in said cavity.

Preferably, said second tapered-hole in the resin coated die has a large diameter dn(in) at an end and a small diameter dn(out) at another end equal to the second diameter of the second hole, wherein the first diameter of the first hole of the nipple hole is defined as dm, and the third diameter of the third hole of the intermediate die is defined as $d_1$, and the following relationship are defined:

$$dn(\text{in}) > d_1 > dn(\text{out}) \quad dm < d_1$$

More preferably, the optical fiber resin coating apparatus further comprises at least one additional intermediate die provided between said intermediate die and said resin coating die. The additional intermediate die includes a fifth hole which communicates said third hole in said intermediate die and said second tapered-hole in said resin coating die and has a fifth diameter, and a sixth hole which communicates to said fourth hole in said intermediate die. The first resin flow path is defined at a boundary position of the nipple and the intermediate die, said first resin flow path communicating the resin reserving chamber, the end of the nipple hole and the third hole in the intermediate die. The second resin flow path is defined at a boundary position of the additional intermediate die and the resin coating die, said second resin flow path communicating the fifth hole, the second tapered-hole and the sixth hole. A third resin flow path is defined at a boundary position of the intermediate die and the additional intermediate die, said third resin flow path communicating the third hole and the fourth hole. The fifth diameter of the fifth hole in the additional intermediate die may be equal to said third diameter in the intermediate die. The fifth diameter of the fifth hole in the additional intermediate die may be defined as $$d_1 < d_2 < d_n(\text{in}).$$

The fifth hole in the additional intermediate die has a tapered-inner wall the maximum inner diameter $d_2$ of the inner wall may be defined as $d_1 < d_2 \leq d_n(\text{in})$.

BRIEF DESCRIPTION OF THE DRAWINGS

The above and other objects and features of the present invention will be become more apparently by the following description with reference to the accompanying drawings, in which.

DESCRIPTION OF THE PREFERRED EMBODIMENTS

First Embodiment

Figure 1:
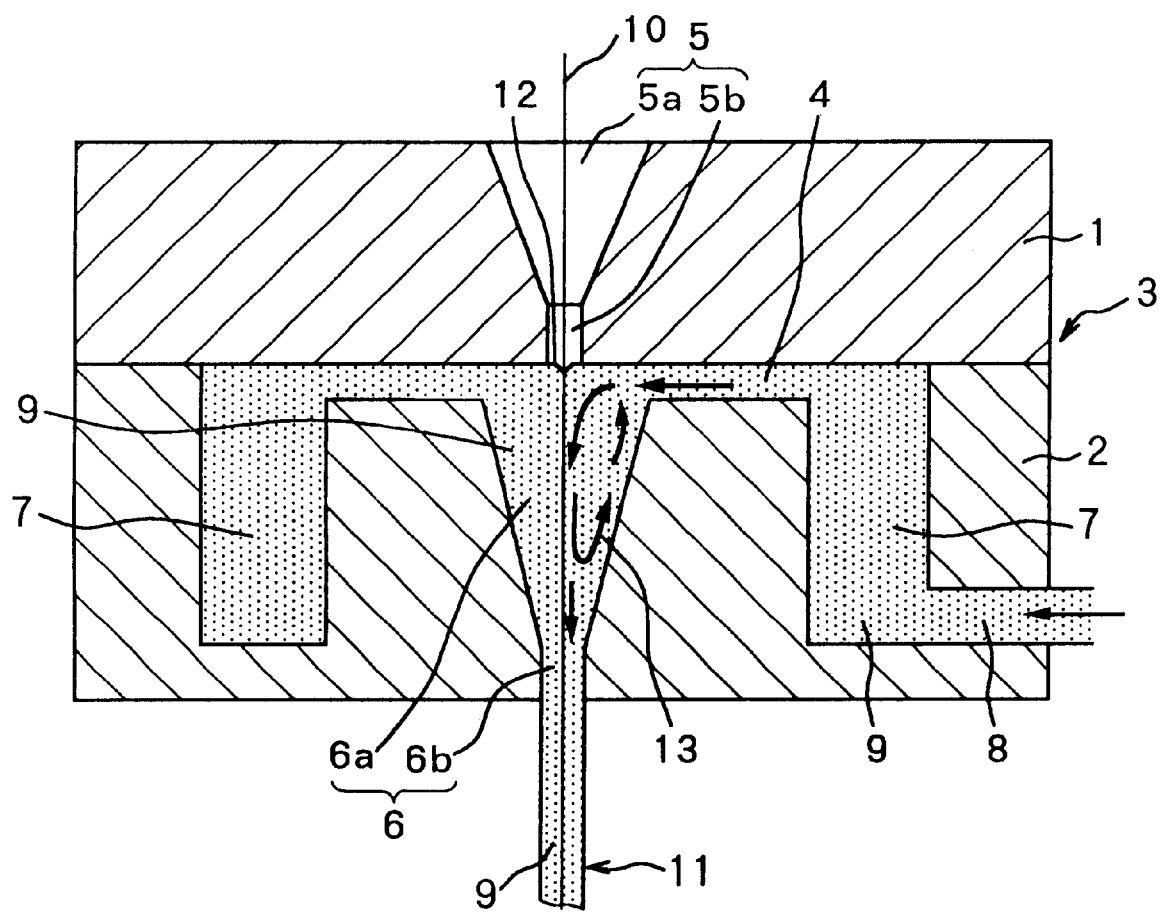
FIG. 1 is a sectional view of an optical fiber resin coating apparatus of a related art.
Figure 2:
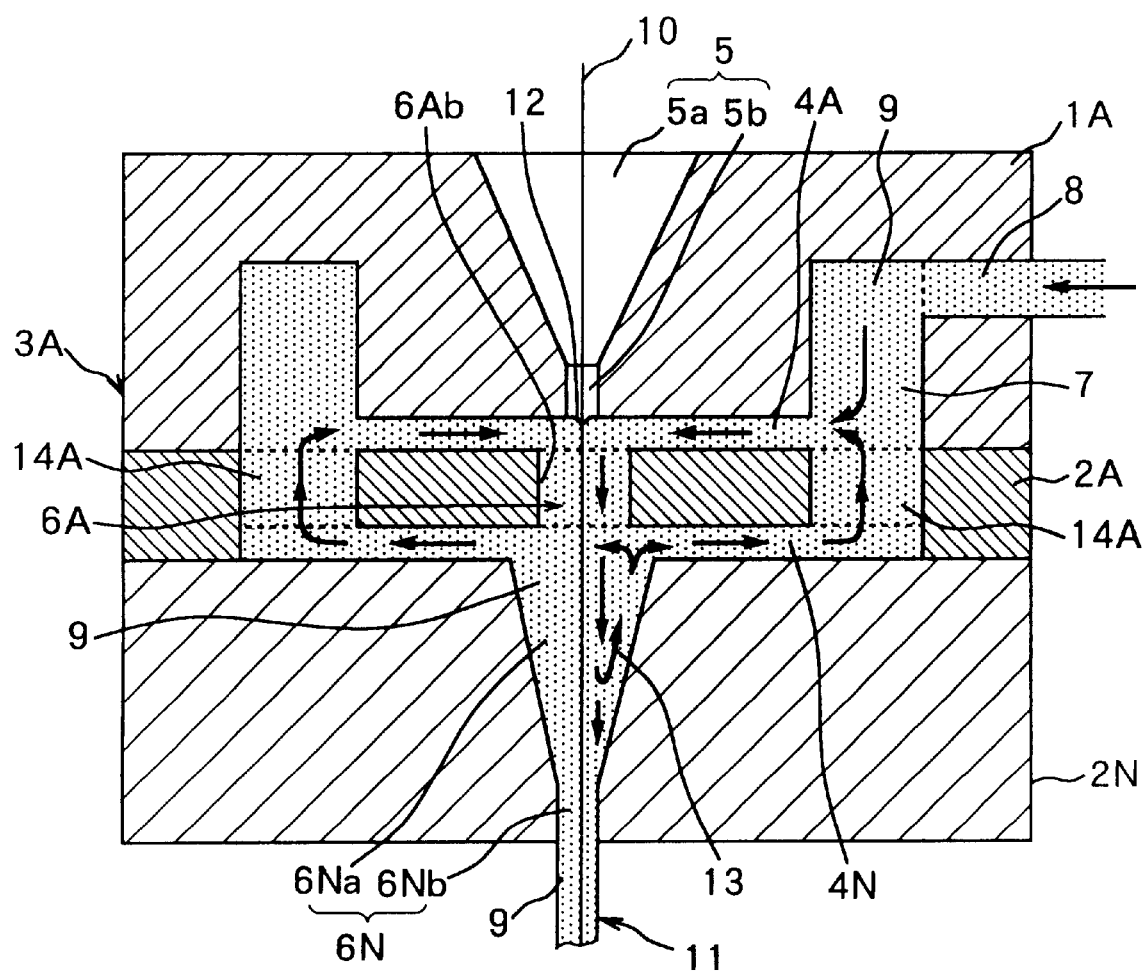
FIG. 2 is a sectional view of a first embodiment of an optical fiber resin coating apparatus of the present invention.

Referring to FIGS. 1 and 2, a first embodiment of an optical fiber resin coating apparatus of the present invention will be described.

FIG. 2 is a sectional view of a first embodiment of an optical fiber resin coating apparatus of the present invention.

The optical fiber resin coating apparatus shown in FIG. 2 includes a nipple 1A, an intermediate die 2A and a resin coating die 2N. The nipple 1A, the intermediate die 2A and the resin coating die 2N are assembled as an integrated assembly 3A. In this specification, this integral assembly is defined as the "optical fiber resin coating apparatus".

The nipple 1A forming part of the assembly (optical fiber resin coating apparatus) 3A is provided with a nipple hole 5 which is constituted by a tapered-hole portion 5a and a land portion 5b. At the outlet of the nipple hole 5b, a meniscus-shaped portion 12 which defines a boundary face of an optical fiber 10 and a resin 9 and has a meniscus shape may be formed. The nipple 1A is also provided with a resin supply inlet 8 and a resin supply chamber 7. The resin supply inlet 8 receives the UV type molten resin 9 and supplies the same to the resin supply chamber 7. The nipple 1A is further provided with a first recess for defining a first resin flow path 4A.

An optical fiber 10 will be introduced into the nipple hole 5. The nipple hole 5 is positioned at a center of the nipple 1A. The resin supply chamber 7 is formed in a coaxial portion of a center axis of the nipple hole 5 through which the optical fiber 10 is introduced. The resin supply chamber 7 has a size for temporary storing the UV type resin 9.

The intermediate die 2A forming the assembly 3A is provided with a communicating hole 14A which is communicated to the resin supply chamber 7 in the nipple 1A and has an sectional area meeting to the resin supply chamber 7, and a center die hole 6A. The intermediate die 2A is also provided with a second recess for defining a second resin flow path 4N.

The resin coating die 2N forming the assembly 3A is provided with a center die hole 6N formed by a tapered-hole portion 6Na and a land portion 6Nb. Inside of the tapered-hole portion 6Na a cavity, in which a resin circular flow 13 may be formed, is defined.

When assembled the nipple 1A, the intermediate die 2A and the resin coating die 2N to form the integrated assembly (optical fiber resin coating apparatus) 3A, the center axis of the nipple hole 5 in the nipple 1A, the center axis of the die hole 6A in the intermediate die 2A and the center axis of the resin coating die 2N are perfectly matched to define a path which passes the optical fiber 10. At a boundary portion of the nipple 1A and the intermediate die 2A, the first resin flow path 4A is defined, and the sections of the resin supply chamber 7 and the communicating hole 14A are matched.

At a boundary portion of the intermediate die 2A and the resin coating die 2N, the second resin flow path 4N is defined. The die hole 6A in the intermediate die 2A communicates the meniscus-shaped portion 12 of the nipple 1A and the cavity of the tapered-hole portion 6Na of the die hole 6N.

As illustrated in FIG. 2, the UV type resin 9 introduced into the resin supply chamber 7 from the resin supply inlet 8 flows a flow path of the resin supply chamber 7, the first resin flow path 4A, the meniscus-shaped portion 12, the die hole 6A, the cavity inside, the tapered-hole portion 6Na of the die hole 6N, the second resin flow path 4N, the communicating hole 14A, and the first resin flow path 4A.

Note the resin circular flow 13 may be generated in the cavity inside the tapered-hole portion 6Na of the die hole 6N. The UV type resin 9 introduced into the cavity inside the tapered-hole portion 6Na is coated on the outer surface of the optical fiber 10 to produce a resin coated optical fiber 11 and the redundant resin may flow back to the second resin flow path 4N.

The optical fiber 10 may be a single mode optical fiber consisting of a core having a diameter of 10 μm and a cladding formed on the core and having a diameter of 125 μm. The diameter of the resin coated optical fiber 11 is, for example, 0.25 mm. The diameter of a hole formed in the land portion 6Nb of the die hole 6N is designed to define the outer diameter of the resin coated optical fiber 11.

Figure 3:
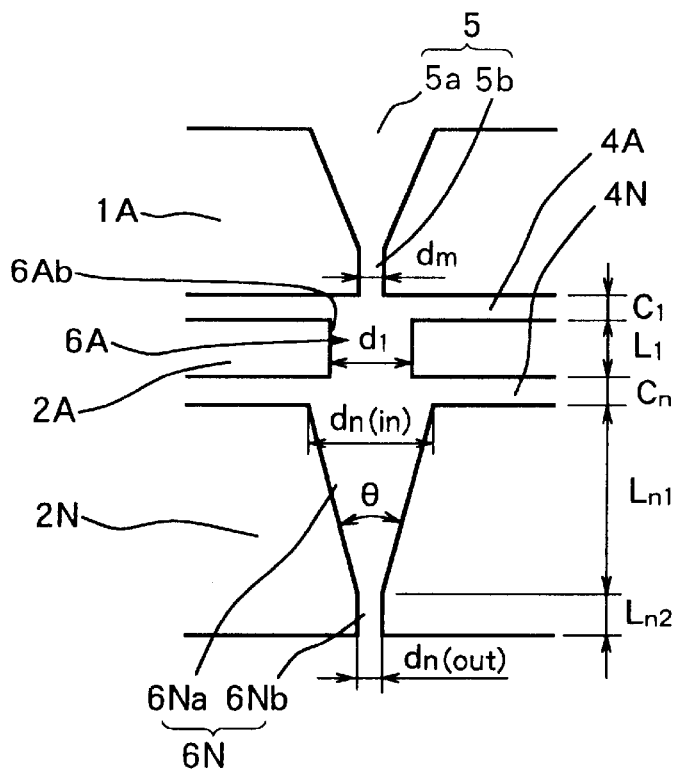
FIG. 3 is an enlarged sectional view of a part of the optical fiber resin coating apparatus shown in FIG. 2.

Referring to FIG. 3, a size of the assembly 3A shown in FIG. 2 will be described. FIG. 3 is an enlarged view of the nipple hole 5 in the nipple 1A, the die hole 6A in the intermediate die 2A and the die hole 6N in the resin coating die 2N.

The sizes discussed below are important to avoid the generation of the disorder of the circular resin flow 13 in the cavity inside the tapered-hole portion 6Na of the die hole 6N.

Nomenclatures (references) in FIG. 2 are as follows:

dm: an inner diameter of a hole formed at the land portion 5b in the nipple hole 5, $d_1$: an inner diameter of the die hole 6A formed in a land portion 6Ab of the intermediate die 2A, dn(in): an inlet inner diameter of the tapered-hole portion 6Na of the die hole 6N, dn(out): an outlet inner diameter of the tapered-hole portion 6Na and an inner diameter of a hole formed in the land portion 6Nb of the die hole 6N, $C_1$: a height (a clearance) of the first resin flow path 4A, $C_n$: a height (a clearance) of the second resin flow path 4N, $L_1$: a height (a length or a thickness) of the intermediate die 2A, $L_{n1}$: a length of the tapered-hole portion 6Na of the die hole 6N, and $L_{n2}$: a length of the tapered-hole portion 6Na of the die hole 6N.

The tapered-hole portion 6Na is formed between the inlet inner diameter dn(in) and the outlet inner diameter dn(out) spaced by the length $L_{n1}$ and has an angle θ. Of course, dn(in)>dn(out).

The diameter $d_1$ of the die hole 6A formed in the land portion 6Ab is smaller than the inlet diameter dn(in) of the tapered-hole portion 6Na of the die hole 6N. The inner diameter dm of the hole at the land portion 5b is smaller than the inner diameter $d_1$ of the die hole 6A. Thus, the following equations stand.

$$dn(\text{in}) > d_1 > dn(\text{out}) \quad (1)$$

$$d_m < d_1 \quad (2)$$

The intermediate die 2A is provided with only the die hole 6A formed by the land portion 6Ab, in other words, the intermediate die 2A is not provided with a tapered-hole portion, and thus a circular flow of the resin 9 does not generate in the die hole 6A.

To ensure the smooth flow of the resin 9, a section area of the first resin flow path 4A should be simply reduced from an end of the same at the resin supply chamber 7 to another end of the same at the die hole 6A.

The UV type resin 9 is introduced into the resin supply chamber 7 through the resin supply inlet 9, introduced into the die hole 6A of the intermediate die 2A through the first resin flow path 4A and introduced into the cavity inside the tapered-hole portion 6Na of the resin coating die 2N. The circular flow 13 of the resin 9 is formed in the cavity inside the tapered-hole portion 6Na.

A part of the resin 9 in the circular flow 13 directs to the resin supply chamber 7 through the second resin flow path 4N and the communicating hole 14A since the sized of the holes designed to meet the conditions as stated by the equations 1 and 2.

The analysis of the assembly (optical fiber resin coating apparatus) 3A will be described.

The provision of the second resin flow path 4N formed at the boundary of the intermediate die 2B and the resin coating die 2N and functioning as a communicating path together with the communicating hole 14A for communicating the tapered-hole portion 6Na and the resin reserving chamber 7, enables the escape (or the return) of the part of the UV type resin 9 in the circular flow 13 in the cavity inside the tapered-hole portion 6Na to the resin reserving chamber 7 to reduce the speed of the circular flow 13. The lowering of the speed of the circular flow 13 means the lowering of the speed energy of the circular flow 13, prevents the disorder of the circular flow 13 even if the resin coated optical fiber 11 is drew out at a high speed.

Of course, the provision of the first resin flow path 4A formed at the boundary of the nipple 1A and the intermediate die 2B and functioning as a communicating path communicating the resin reserving chamber 7 and the die hole 6A forms a major circular flow path of the resin reserving chamber 7, the first resin flow path 4A, the die hole 6A, the cavity of the tapered-hole portion 6Na wherein the circular flow 13 is generated, the second resin flow path 4N, the communicating hole 14A and the resin reserving chamber 7.

Second, the design of the sizes of the diameters of the holes as stated by the formula 1 and 2 facilitates the escape of the redundant resin 9 to the resin reserving chamber 7 and suppresses the generation of the circular flow in the die hole 6A in the intermediate die 2B. Under the conditions, the flow at the meniscus-shaped portion 12 positioned at the outlet of the nipple hole 5 is free from the circular flow 13 in the cavity at the tapered-hole portion 6Na, in other words, the shape of the meniscus-shaped portion 12 can be kept at a desired shape.

As a result, the assembly (optical fiber resin coating apparatus) 3A of the present embodiment may achieve the objects of the present invention, namely, the stable proportion of a resin coated optical fiber having a uniform diameter at the high speed drawing the same and free from the lack of resin coating.

EXAMPLE

Table 1 shows the specific sizes of the holes and the taper angle θ of the assembly (optical fiber resin coating apparatus) 3A of FIGS. 2 and 3.

TABLE 1

| No. | dm | $C_1$ | $L_1$ | d1 | Cn | $Ln_1$ | $Ln_2$ | dn(out) | θ | dn(in) |
|---|---|---|---|---|---|---|---|---|---|---|
| A | 0.3 | 0.2 | 1.0 | 0.8 | 0.3 | 10 | 0.5 | 0.25 | 5° | 1.1 |
| B | 0.3 | 0.3 | 1.0 | 0.8 | 0.3 | 7 | 0.5 | 0.25 | 10° | 1.5 |
| C | 0.3 | 0.4 | 1.0 | 0.8 | 0.3 | 5 | 0.5 | 0.25 | 15° | 1.6 |
| D | 0.3 | 0.3 | 1.0 | 0.6 | 0.3 | 7 | 0.5 | 0.25 | 10° | 1.5 | unit: mm for dm, C1, L1, d1, Cn, Ln1, Ln2, dn(out) and dn(in)

Figure 4:
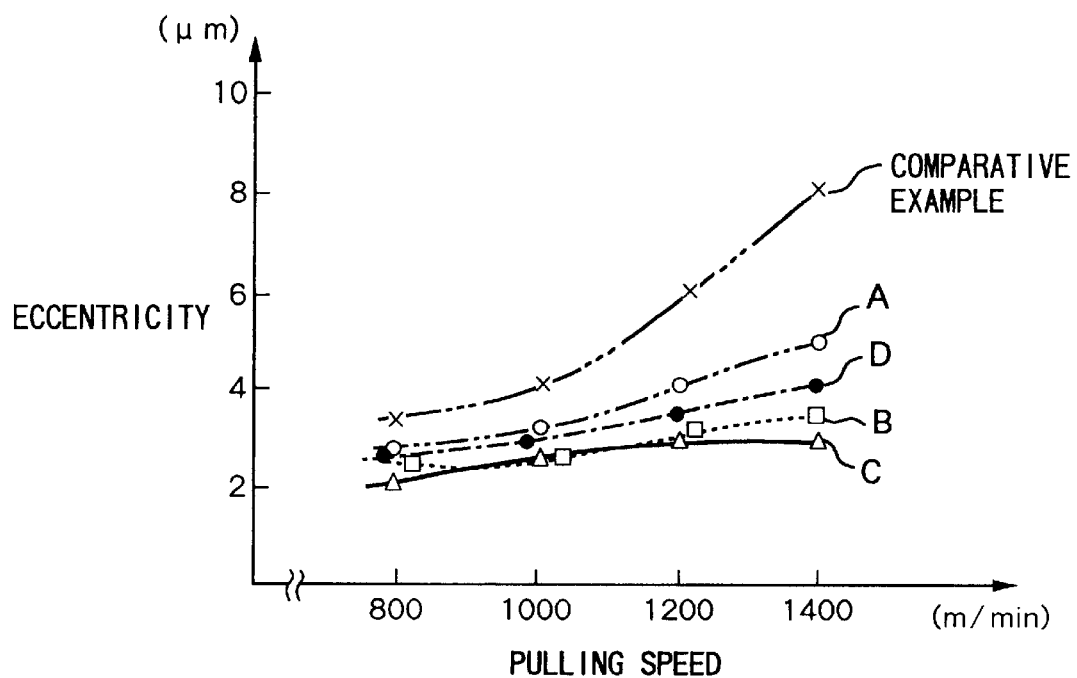
FIG. 4 is a graph showing examples used the optical fiber resin coating apparatus of the first embodiment and a comparative example of the related art.

FIG. 4 is a graph showing examples of the resin coated optical fiber 11 produced by the assembly (optical fiber resin coating apparatus) 3A under the conditions of Table 1, and a comparative example of the resin coated optical fiber produced by the optical fiber resin coating apparatus shown in FIG. 1.

The optical fiber 10 was a single mode optical fiber consisting of a core having a diameter of 10 μm and a cladding having a diameter of 125 μm. The outer diameter (dn(out)) of the resin coated optical fiber 11 was 0.25 mm as shown in Table 1. The resin 9 was urethane-acrylic resin. The drawing speed (line speed) of the resin coated optical fiber 11 for drawing out the same from the assembly was varied at 800, 1000, 1200 and 1400 m/min, as shown by the abscissa of FIG. 4. The ordinate of FIG. 4 shows the eccentricity value of the diameter of the resin coated optical fiber 11.

A first example A of the assembly 3A shows that the taper angle θ of the tapered-hole portion 6Na is 5° and inlet inner diameter dn(in) of the tapered-hole portion 6Na is 1.1 mm. Curve A shows the eccentricity value of the resin coated optical fiber 11 produced by the first example A of the assembly 3A. Curve A shows that the eccentricity value is smaller than 4 μm under the drawing speed 800 to 1200 m/min.

Second to fourth examples B to D of the assembly 3A have the large taper angle θ of the tapered-hole portion 6Na, of 10° to 15°, to that of the example A. Curve B to D show the eccentricity values of the resin coated optical fiber 11 produced by the second to fourth examples B to D of the assembly 3A. Curves B to D show that the eccentricity values are smaller than 4 μm under the drawing speed 800 to 1400 m/min.

A comparative example was that the eccentricity value exceeds 6 μm when the drawing speed was equal to and higher than 1200 m/min.

From the above examples, it is understood that the assembly (optical fiber resin coating apparatus) 3A of the embodiment of the present invention realizes a stable resin coating, and thus the lack of resin coating on the optical fiber 10 could be avoided, at a high speed drawing.

Second Embodiment

Figure 5:
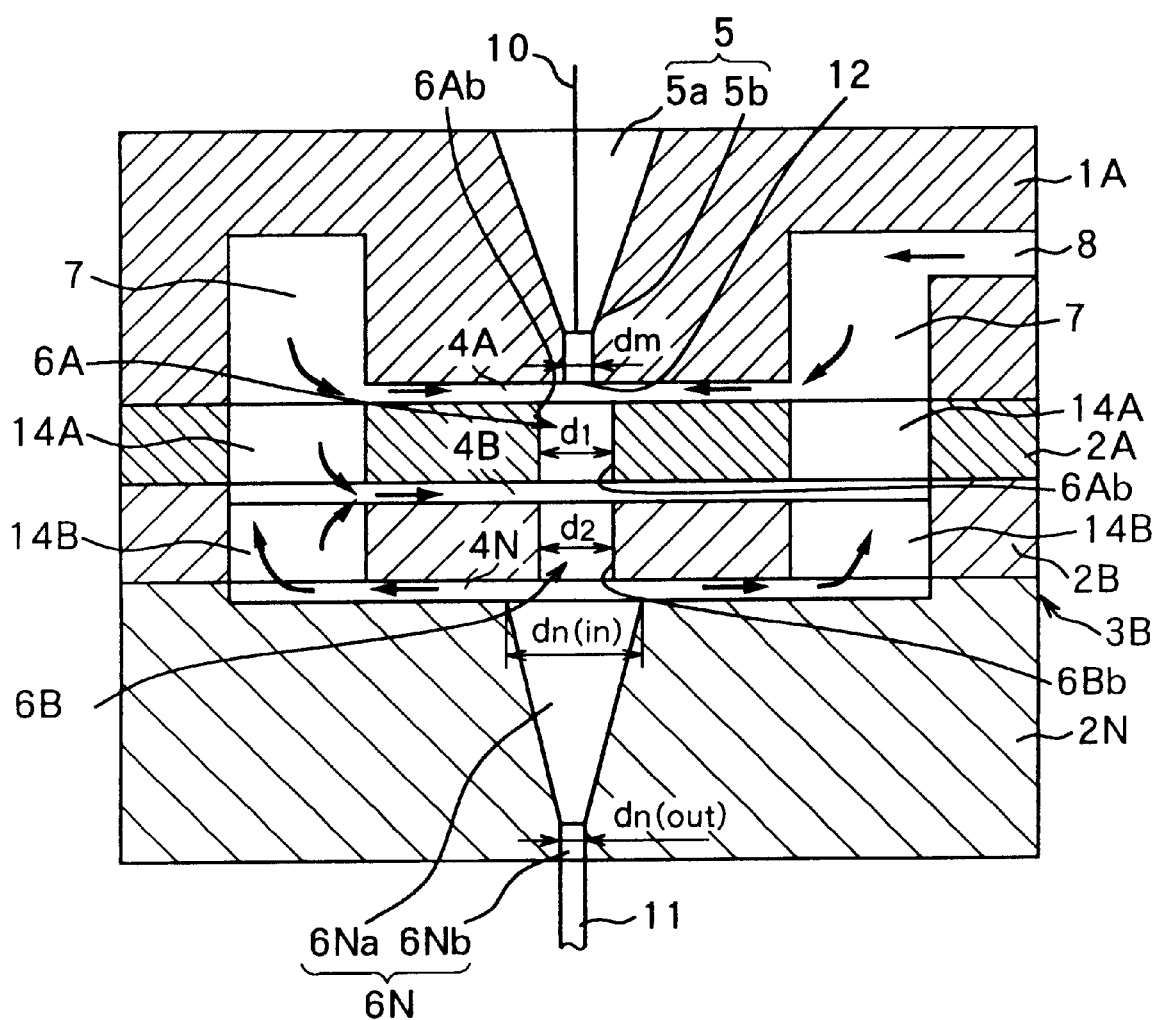
FIG. 5 is a sectional view of a second embodiment of an optical fiber resin coating apparatus of the present invention.

Referring to FIG. 5, a second embodiment of an assembly (optical fiber resin coating apparatus) of the present invention will be described. FIG. 5 is a sectional view of an assembly 3B of the second embodiment. In FIG. 5 references indicating components (elements) constituting the assembly 3B, same as or similar to those in FIGS. 2 and 3, are used as same to the references in FIGS. 2 and 3.

The assembly 3B is constituted by a nipple 1A, a first intermediate die 2A, a second intermediate die 2B, and a resin coating die 2N, as an integrated assembly.

The nipple 1A and the resin coating die 2N are substantially same to those in the first embodiment of the assembly 3A.

The first and second intermediate dies 2A and 2B shown in FIG. 5 correspond to the intermediate die 2A in FIG. 2. Namely, the intermediate die comprises (or is divided) the first and second sub-intermediate die 2A and 2B in the second embodiment, but the intermediate die can comprise two or more sub-intermediate dies. In the second embodiment, as a specific example, two sub-intermediate dies, i.e., the first and second intermediate die 2A and 2B, will be described.

The first intermediate die 2A is provided with a die hole 6A having an inner diameter di and defined by a land portion 6Ab, and a first communicating hole 14A communicating to the resin reserving chamber 7 in the nipple 1A.

The second intermediate die 2B is provided with a die hole 6B having an inner diameter $d_2$ and defined by a land portion 6Bb, and a second communicating hole 14B communicating to the first communicating hole 14A of the first intermediate die 2A.

A first resin flow path 4A is defined at a boundary position of the nipple 1A and the first intermediate die 2A, a second resin flow path 4N is defined at a boundary position of the second intermediate die 2B and the resin coating die 2N, and a third resin flow path 4B is defined at a boundary position of the first intermediate die 2A and the second intermediate die 2B.

The first to third resin flow path 4A, 4N and 4B and the first and second die holes 6A and 6B communicate the resin reserving chamber 7 and the cavity inside the tapered-hole portion 6Na of the die hole 6N.

Center axes of the nipple hole 5, the first die hole 6A, the second die hole 6B, the die hole 6N coincide and define the path moving the optical fiber 10. The resin reserving chamber 7, the first communicating hole 14A and the second communicating hole 14B are aligned in a vertical direction.

In the second embodiment, the inner diameter $d_1$ of the first die hole 6A is equal to the inner diameter $d_2$ of the second die hole 6B. That is, $d_1=d_2$.

The inner diameter $d_2$ of the second die hole 6B is smaller than an inlet inner diameter $d_n$ (in) of the tapered-hole portion 6Na. That is, $d_2<d_n(in)$.

An outlet inner diameter $d_n(out)$ of the tapered-hole portion 6Na is equal to an inner diameter of a hole defined by a land portion 6Na and is smaller than the inlet inner diameter $d_n(in)$ of the tapered-hole portion 6Na. That is, $d_n(in)>d_n(out)$.

The inner diameter $d_m$ of a hole defined by the land portion 5b of the nipple hole 5 is smaller than the inner diameter $d_1$ of the die hole 6A.

Accordingly, the following equations stand:

$$d_n(in)>d_1=d_2>d_n(out) \quad (4)$$

$$d_m<d_1 \quad (5)$$

In the assembly 3B shown in FIG. 5, the UV type resin 9 introduced into the resin reserving chamber 7 passes the first resin flow path 4A and flows into the first die hole 6A. The resin 9 passes the second die hole 6B and flows into the cavity inside the tapered-hole portion 6Na to coat the same on the outer surface of the optical fiber 10. The circular flow may be generated in the cavity inside the tapered-hole portion 6Na and the redundant resin flows through the second resin flow path 4N and reaches to the communicating hole 14B. The resin 9 in the resin reserving chamber 7 has a strong pressure than that of the resin 9 in the communicating hole 14B, and thus the resin 9 in the communicating hole 14B passes through the third resin flow path 4B, enters in the second die hole 6B and flows into the cavity inside the tapered-hole portion 6Na.

The provision of the third resin flow path 4B establishes a branched major circular flow path formed by the third resin flow path 4B, the second die hole 6B, the cavity inside the tapered-hole portion 6Na, the second resin flow path 4N and the communicating hole 14B. Compared with the first embodiment of the assembly 3A, the branched major circular flow path has a rapid response than that of the major circular flow path consisting of the second resin flow path 4N, the communicating hole 14A, the resin flow path 4A, and the die hole 6A of the first embodiment shown in FIG. 2. Further, the branched major circular flow path does not include the meniscus-shaped portion 12, therefore, the meniscus-shaped portion is not affected by the disorder of the circular flow in the cavity inside the tapered-hole portion 6Na. As a result, the assembly 3B improves a quality of the resin coated optical fiber 11, i.e., the elimination of the lack of the resin, and the formation of uniform diameter of the resin coated optical fiber 11. The assembly 3B enables a more high speed drawing.

Of course, in the second embodiment of the assembly 3B, the generation of the disorder of the circular flow may be prevented, as to the first embodiment, by the conditions of the equations 4 and 5.

Third Embodiment

Figure 6:
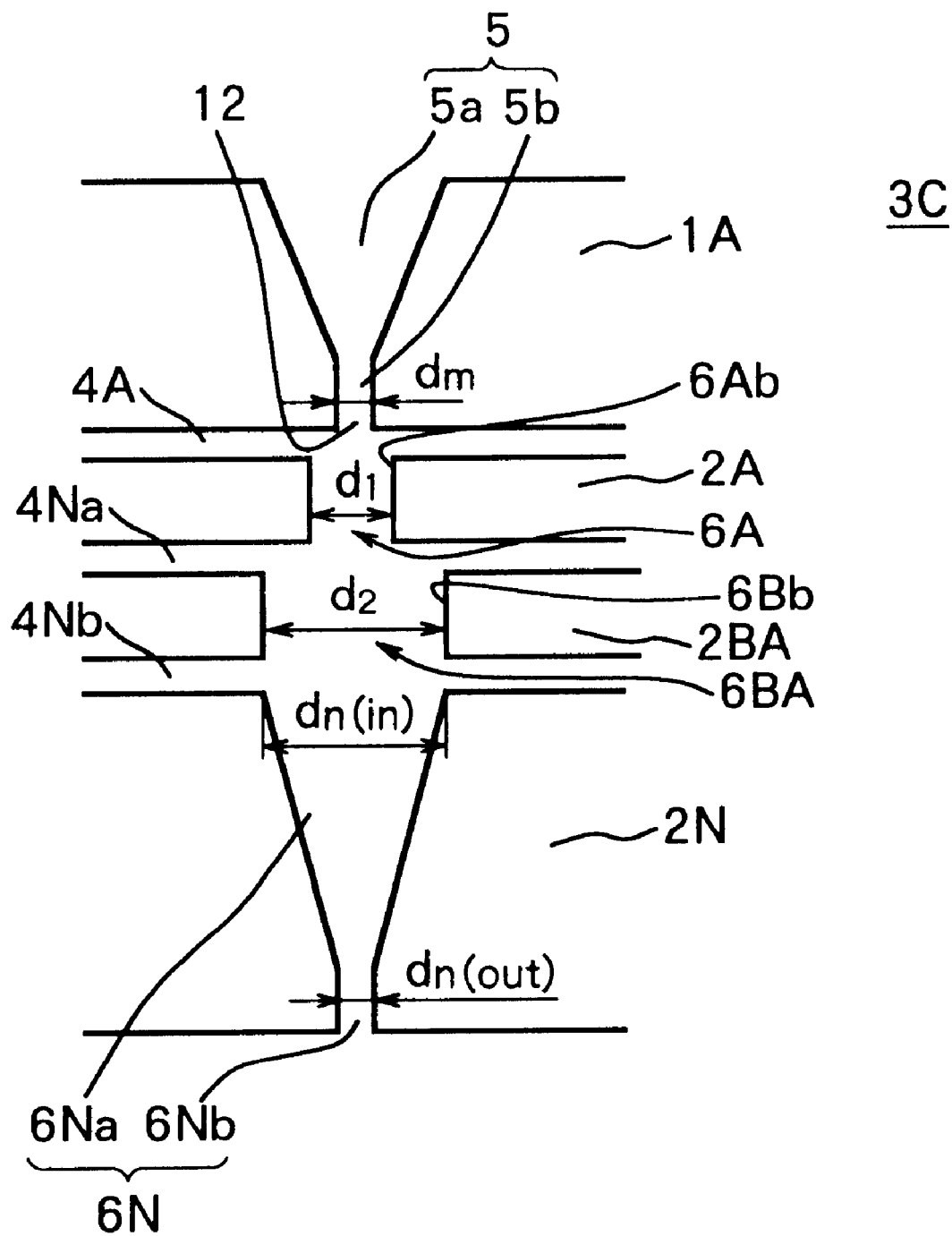
FIG. 6 is an enlarged view of a part of a third embodiment of an optical fiber resin coating apparatus of the present invention.

Referring to FIG. 6, a third embodiment of an assembly (optical fiber resin coating apparatus) 3C of the present invention will be described. FIG. 6 is an enlarged sectional view of a part of the assembly 3C.

The assembly 3C has the structure similar to that of the assembly 3B shown in FIG. 5 except for the following relationship.

$$d_1 \neq d_2 \tag{6}$$

$$d_2 = d_n(\text{in}) \tag{7}$$

In the assembly 3C shown in FIG. 6, the redundant resin can pass through resin flow path 4Na formed at a boundary portion of the first intermediate die 2A and the second intermediate die 2BA and a resin flow path 4Nb formed at a boundary portion of the second intermediate die 2BA and the resin coating die 2N, because a second die hole 6BA formed in the second intermediate die 2BA has a large diameter $d_2$ equal to the inner diameter $d_n(\text{in})$ of the tapered-hole portion 6Na. As a result, the flow speed of the circular flow in the cavity inside the tapered-hole portion 6Na may be lowered. Consequently, the generation of the disorder of the circular flow in the cavity inside the tapered-hole portion 6Na can be prevented and the flow of the resin adjacent to the meniscus-shaped portion 12 can be stabilized.

The assembly 3C improves a quality of the resin coated optical fiber. Namely, the resin coated optical fiber without the lack of the resin and with a uniform diameter may be produced. The assembly 3C also enables a more high speed drawing.

Fourth Embodiment

Figure 7:
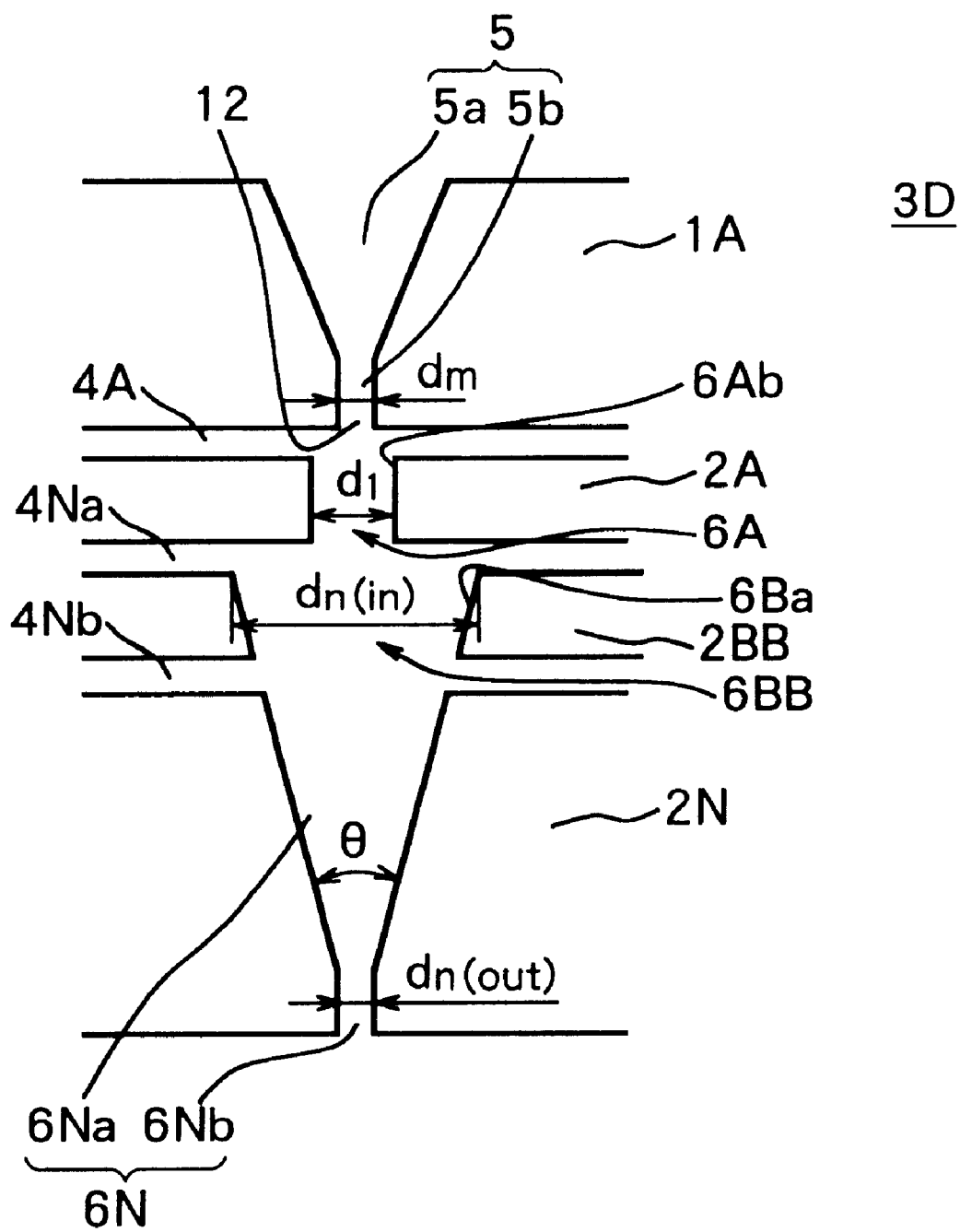
FIG. 7 is an enlarged view of a part of a fourth embodiment of an optical fiber resin coating apparatus of the present invention.

Referring to FIG. 7, a fourth embodiment of an assembly (optical fiber resin coating apparatus) 3D of the present invention will be described. FIG. 7 is an enlarged sectional view of a part of the assembly 3D.

The assembly 3D has the structure similar to that of the assembly 3B except for the following conditions.

A second intermediate die 2BB is provided with a die hole 6BB having an inclined inner wall. The inclined-shape die hole 6BB has an inlet inner diameter $d_n(\text{in})$ equivalent to the inlet inner diameter $d_n(\text{in})$ of the tapered-hole portion 6Na shown in FIG. 5. The following equations stand.

$$d_m < d_1 \tag{8}$$

$$d_n(\text{in}) > d_1 > d_n(\text{out}) \tag{9}$$

The flow paths of the assembly 3D are substantially equal to those of the assembly 3C In FIG. 6.

The assembly 3D of the fourth embodiment results in the effects same as those of the assembly 3C of the third embodiment.

In the above embodiments, the production of the resin coated single mode optical fiber was discussed, but the optical fiber resin coating apparatus (assembly) of the present invention can be applied to a variety of optical fibers.

As described above, the optical fiber resin coating apparatus of the present Invention produces a high quality resin coated optical fiber having a uniform diameter and without the lack of the resin at a high speed. Therefore, the present invention improves the yield of the resin coated optical fiber.

Further, the present invention enables a high speed drawing of the resin coated optical fiber. Thus, the present invention Improves the productivity of the resin coated optical fiber.

What is claimed is:

1. An optic fiber resin coating apparatus comprising:
   a nipple including a nipple hole, a resin reserving chamber for storing a resin, and a resin supply inlet, said nipple hole having a first tapered-hole portion through which an optical fiber is introduced therethrough and a first land portion continuing from the first tapered-hole portion and defining a first hole of a first diameter, a meniscus-shaped portion being positioned at an end of the first land portion;
   a resin coating die, including a second tapered-hole and a second land portion continuing from the second tapered-hole and defining a second hole of a second diameter of a resin coated optical fiber; and
   an intermediate die provided between the nipple and the resin coating die, including a third hole which communicates an end of the nipple hole and the second tapered-hole and has a third diameter, and a fourth hole which communicates with the resin reserving chamber,
   a center axis of the nipple hole in the nipple, a center axis of the second hole of the resin coating die and a center axis of the third hole of the intermediate die being aligned,
   a first resin flow path being defined at a boundary position of the nipple and the intermediate die, said first resin flow path communicating with the resin reserving chamber, the end of the nipple hole and the third hole in the intermediate die, and
   a second resin flow path being defined at a boundary position of the intermediate die and the resin coating die, said second resin flow path communicating with the third hole in the intermediate die, the second tapered-hole in the resin coating die and the fourth hole of the intermediate die, and said second resin flow path communicating with said resin reserving chamber connected to said first resin flow path through said tapered-portion of said resin coating die and said fourth hole of said intermediate die.

2. An optical fiber resin coating apparatus according to claim 1, wherein said first hole of the first diameter, said third hole of the third diameter, said second hole of the second diameter, said second tapered-hole, said first and second resin flow paths are defined, so that a first circular resin flow path, including said resin reserving chamber, said first resin flow path, said third hole, a cavity defined in said second tapered-hole, said second resin flow path, said fourth hole and said resin reserving chamber, is formed, and a second circular resin flow is caused in said cavity.

3. An optical fiber resin coating apparatus according to claim 2, said second tapered-hole in the resin coating die has a large diameter dn(in) at an end and a small diameter dn(out) at another end equal to the second diameter of the second hole, wherein the first diameter of the first hole of the nipple hole is defined as dm, and the third diameter of the third hole of the intermediate die is defined as $d_1$, and wherein the following relationships stand:

$$dn(\text{in}) > d_1 > d_n(\text{out}) \quad d_m < d_1.$$

4. An optical fiber resin coating apparatus according to claim 2, further comprising at least one additional intermediate die provided between said intermediate die and said resin coating die, said additional intermediate die including a fifth hole which communicates said third hole in said intermediate die and said second tapered-hole in said resin coating die and has a fifth diameter, and a sixth hole which communicates to said fourth hole in said intermediate die, said first resin flow path being defined at a boundary position of the nipple and the intermediate die, said first resin flow path communicating the resin reserving chamber, the end of the nipple hole and the third hole in the intermediate die, said second resin flow path being defined at a boundary position of the additional intermediate die and the resin coating die, and communicating the fifth hole, the second tapered-hole and the sixth hole, and a third resin flow path being defined at a boundary position of the intermediate die and the additional intermediate die, said third resin flow path communicating the third hole and the fourth hole.

5. An optical fiber resin coating apparatus according to claim 4, wherein said fifth diameter of the fifth hole in the additional intermediate die is equal to said third diameter in the Intermediate die.

6. An optical fiber resin coating apparatus according to claim 4, wherein said fifth diameter $d_2$ of the fifth hole in the additional intermediate die is defined as $$d_1 < d_2 < d_n(\text{in}).$$

7. An optical fiber resin coating apparatus according to claim 4, wherein said fifth hole in the additional intermediate die has a tapered-inner wall, the maximum inner diameter $d_2$ of the inner wall is defined as $d_1 < d_2 \leq d_n(\text{in})$.

* * * * *